April 20, 1926.
S. R. BERGMAN
ALTERNATOR FIELD
Filed Nov. 8, 1924
1,581,828
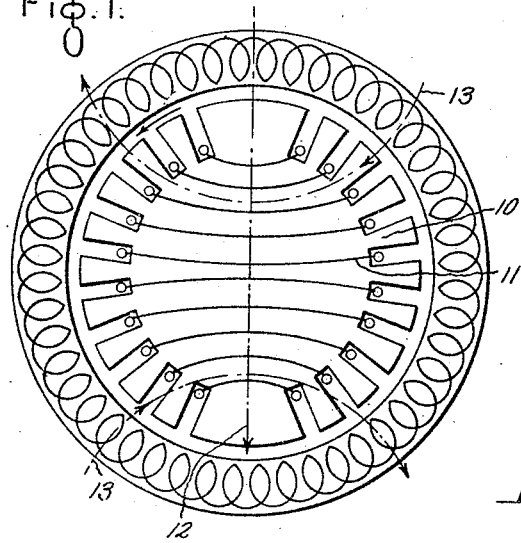
Fig. 1.
Fig. 2.
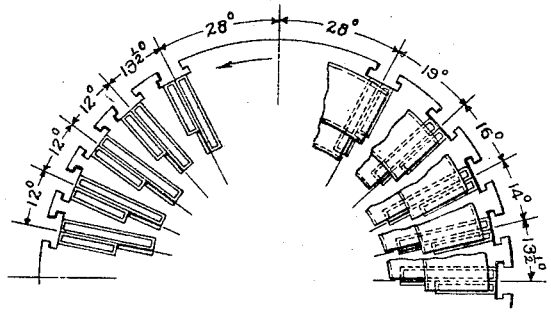
Fig. 3.
Fig. 4.
Inventor:
Sven R. Bergman
by
His Attorney.

Patented Apr. 20, 1926.

1,581,828

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ALTERNATOR FIELD.

Application filed November 8, 1924. Serial No. 748,775.

*To all whom it may concern:*

Be it known that I, SVEN R. BERGMAN, a subject of the King of Sweden, residing at Nahant, in the county of Essex, State of Massachusetts, have invented certain new and useful Improvements in Alternator Fields, of which the following is a specification.

My invention relates to the design of rotor fields for alternating current dynamo electric machines, particularly high speed, turbo alternators, where the rotor is of relatively small diameter.

The alternating current dynamo electric machine, like the direct current machine, has an armature reaction, that is to say, the load currents flowing in the alternating current winding of the stator distort the normal field flux of the rotor. In the direct current machine, the armature reaction is fixed in space, while in the alternating current machine, with rotating field, the armature reaction rotates at synchronous speed. Compensation for armature reaction in direct current machines has long been used successfully and although compensation for armature reaction for alternating current generators has been proposed heretofore and tried out, it has not met with success and is not used to any appreciable extent, if at all at the present time. German Patent No. 262,772 is representative of the efforts of prior investigators in this respect. Recent investigations show reasons why such compensation is not successful. One reason for this is that the rotor fields of high speed machines are already crowded for space by the main field winding which leaves little room for a compensating winding. The main reason is that the rotor field core of such machines is round without definite poles and therefore it is difficult to compensate because the flux of any compensating windings will combine vectorially with the main field flux and produce a resultant field without materially affecting the flux set up by armature reaction.

My invention relates to the problem of reducing the detrimental effect of armature reaction in such machines. In carrying my invention into effect, I do not attempt to compensate by additional compensating windings, but rather, I design the field of the machine so that it is slightly unsymmetrical at no load and in such a direction as to improve the flux wave shape with increasing load.

It is known that the position in space of the direct current field poles with respect to the rotating magnetic field in the stationary stator of such machine shifts with changes in load. It is also evident that the armature reaction varies with the load. I take advantage of these two facts in the design of my improved field element and balance one variable against the other, so to speak. The field is designed so that at no load, it produces a very slightly non-symmetrical flux and so that with increasing load, the combined action of the two variables above referred to tend to alter the shape of the field flux wave in a direction to improve it. The maximum benefit of this arrangement is available for only one direction of rotation, but for the correct direction of rotation, it improves the characteristics of the machine.

The features of my invention which are believed to be novel and patentable will be pointed out in the claims appended hereto. For a better understanding of my invention, reference is made in the following description to the accompanying drawing in which Fig. 1 represents the usual form of rotor field and the effect of armature reaction thereon; Fig. 2 represents the corresponding voltage wave shapes produced in the stator at no load and full load; Fig. 3 represents the rotor of my invention; and Fig. 4 the corresponding no load and full load voltage wave shapes.

Referring to Fig. 1, which shows the usual form of rotor field, 10 represents the rotor and 11 the field winding for a two-pole machine. The general line of the no load field flux is represented by the arrow 12. The flux set up by armature reaction under load is represented by the arrow 13. The direction of the armature reaction flux is in general the same as the field flux on the trailing side of the pole in a generator and is in general opposite to the field flux on the leading side of the pole. The result is that the iron on the trailing side of the pole becomes saturated under load. The armature reaction flux which helps to cause this saturation obviously does not help in producing a useful voltage in the stator windings but causes the main field flux to be shifted toward the other side of the pole.

Curve A of Fig. 2 represents the voltage wave produced by the field flux at no load and curve B represents the voltage wave under load. It will be seen that if the no load voltage wave is symmetrical, the full load voltage wave will be non-symmetrical. This non-symmetrical voltage wave at the time the machine is loaded makes the core loss and load losses higher than is desirable. The extra heating may be taken care of by a liberal and consequently costly design, but the undesirable non-symmetrical voltage wave remains.

In Fig. 3 I have represented one half of a rotor winding and core designed in accordance with my invention. In this case the slots for the field coils on the trailing side of the pole are further apart than on the leading side, the relative spacing which I have found desirable being represented by the angular dimensions noted for the two-pole rotor, thus the slots on the leading side of the pole are spaced from the center of the pole by 28, 41½, 53½, 65½ and 77½ degrees respectively while the corresponding slots on the trailing side of the pole are spaced from the center of the pole by 28, 47, 63, 77 and 90½ degrees respectively. This arrangement permits the iron to be slightly unequally saturated on the two sides of the pole at no load since a larger amount of iron is available for the field flux on the trailing side of the pole. This produces a no load voltage wave which is slightly non-symmetrical as represented at C in Fig. 4. A non-symmetrical no load voltage wave is not particularly objectionable since at that time the heating is not a limiting factor. As the load comes on the machine, the shape of the wave becomes more nearly symmetrical due to the increasing armature reaction flux. The trailing side of the pole piece where the armature reaction flux and the main field flux is generally in the same direction, is liberally proportioned so that the armature reaction flux passes without saturating any part of the rotor core; consequently, the main field flux on both sides of the pole is fully effective.

It will be noted that in the rotor of Fig. 1 the natural lag of the flux between stator and rotor due to increasing generator load tends to crowd the normal field flux toward the trailing portion of the poles which is already saturated. This tends to increase the non-symmetry of the full load voltage wave. In the rotor of Fig. 3 this portion of the field is liberally designed so as not to become saturated; consequently, the normal field flux is allowed to pass even though it is shifted slightly towards the trailing portion of the pole by the natural lag of the field flux behind the rotor with load. This shift is in a direction to improve the symmetry of the full load voltage wave represented at D.

Due to the fact that we now have a symmetrical full load voltage wave which by proper design may be substantially a sine wave, the iron losses, particularly in the stator teeth, are a minimum. It also assures a better voltage wave at the generator terminals which is important in modern systems, where inductive interference with communication circuits must be avoided.

If the machine is to be used as a motor it will be evident that the general direction of armature reaction flux with respect to field flux will be reversed, causing the leading side of the pole to become saturated. Consequently the benefits of my invention may be realized in a synchronous motor if the direction of rotation is reversed from that represented in Fig. 3, thereby making the leading portion of the poles more liberally designed than the trailing pole portions.

What I claim as new and desire to secure by Letters Patent of the United States, is:—

1. A rotor field element for synchronous alternating current machines comprising a slotted core member and a direct current winding thereon arranged to produce alternate north and south poles, said slots being non-symmetrically distributed on opposite sides of the poles.

2. A rotor field element for synchronous alternating current machines comprising a slotted core member and a direct current winding therein arranged to produce alternate north and south poles, the slots on one side of the poles being spaced further apart than the corresponding slots on the other side of the poles.

3. A rotor field element for a synchronous alternating current generator comprising a slotted core member and a direct current winding therein arranged to produce alternate north and south poles, the slots on the trailing sides of the poles being spaced further apart than the corresponding slots on the leading sides of the poles.

4. A synchronous alternating current dynamo electric machine comprising a stator member and a rotary field member, said field member having a slotted core containing a distributed direct current field winding arranged to produce alternate north and south poles, the slots and windings of the field member being arranged to produce magnetic poles of slightly non-symmetrical flux distribution at no load, the flux distribution being such that distortion due to armature reaction under load improves the symmetry of distribution.

5. A synchronous alternating current dynamo electric machine comprising a stationary armature member and a rotary field member, said field member having a slotted core containing a distributed direct current field winding arranged to produce alternate north and south poles of non-symmetrical flux distribution at no load, the non-symmetry being such as to be reduced by the combined action of armature reaction and the shift of the field member with respect to the rotating magnetic field of the armature under load.

6. A bipolar rotor field element for synchronous alternating current machines comprising a slotted core member and a distributed direct current field winding in said slots, the slot spacing being non-symmetrical on opposite sides of the poles substantially as described.

In witness whereof, I have hereunto set my hand this 6th day of November, 1924.

SVEN R. BERGMAN.